US005778118A

United States Patent [19]
Sridhar

[11] Patent Number: 5,778,118
[45] Date of Patent: Jul. 7, 1998

[54] OPTICAL ADD-DROP MULTIPLEXERS FOR WDM OPTICAL COMMUNICATION SYSTEMS

[75] Inventor: Balakrishnan Sridhar, Silver Spring, Md.

[73] Assignee: CIENA Corporation, Linthicum, Md.

[21] Appl. No.: 759,965

[22] Filed: Dec. 3, 1996

[51] Int. Cl.$^6$ ................................................ G02B 6/28
[52] U.S. Cl. ........................... 385/24; 385/27; 385/37; 385/31; 359/114; 359/130
[58] Field of Search ........................ 385/24, 37, 15, 385/27, 31, 10, 11; 359/114, 124, 130, 125

[56] References Cited

U.S. PATENT DOCUMENTS

| | | | |
|---|---|---|---|
| 5,212,578 | 5/1993 | Grimes et al. | 359/124 |
| 5,283,686 | 2/1994 | Huber | 359/337 |
| 5,457,760 | 10/1995 | Mizrahi | 385/37 |
| 5,467,212 | 11/1995 | Huber | 359/168 |
| 5,475,780 | 12/1995 | Mizrahi | 385/37 |
| 5,479,082 | 12/1995 | Calvani et al. | 385/24 X |
| 5,504,609 | 4/1996 | Alexander et al. | 359/125 |
| 5,532,864 | 7/1996 | Alexander et al. | 359/177 |
| 5,557,442 | 9/1996 | Huber | 385/37 X |
| 5,600,473 | 2/1997 | Huber | 385/10 X |

OTHER PUBLICATIONS

Jones et al., *Electronics Letters*, vol. 31, No. 24, 23 Nov. 1995, pp. 2117–2118.
Chawki et al., *Electronics Letters*, vol. 31, No. 6, 16 Mar. 1995, pp. 476–477.
Giles and Mizrahi, *IOOC Tech. Digest*, Jun. 26, 1995, pp. 66–67.
Guy et al., *Electronics Letters*, vol. 30, No. 18, Sep. 1994, pp. 1512–1513.
Morey et al., *Optics & Photonics News*, Feb., 1994, pp. 9–14.

Primary Examiner—Phan T.H. Palmer
Attorney, Agent, or Firm—Margaret Burke

[57] ABSTRACT

The present invention provides an optical add-drop multiplexer for wavelength division multiplexed optical communication systems which includes first and second optical couplers which optically communicate with each other through an optical filter. The first optical coupler includes a first input port and first and second output ports while the second optical coupler includes first and second input ports and an output port An optical path optically communicates with the first output port of the first optical coupler and with the first input port of the second optical coupler and includes an optical filter for selecting portions of a wavelength division multiplexed optical signal input to the first optical coupler. The portions of the wavelength division multiplexed signal which are not sent to an input port of the second optical coupler exit the add-drop multiplexer. An optical path communicating with the second output port of the first optical coupler includes wavelength selectors configured to select one or more optical wavelengths from the wavelength division multiplexed optical signal. Optical channels to be added are sent the second input port of the second optical coupler and combined with the "through" portion of the WDM optical signal such that the output is a new wavelength division multiplexed optical signal output by the second optical coupler.

13 Claims, 3 Drawing Sheets

OPTICAL ADD-DROP MULTIPLEXERS FOR WDM OPTICAL COMMUNICATION SYSTEMS

FIELD OF THE INVENTION

The invention relates to wavelength division multiplexed optical communication systems and, more particularly, to wavelength division multiplexed optical communication systems which include add-drop multiplexers for transferring selected optical channels between optical paths within the optical system.

BACKGROUND OF THE INVENTION

Optical communication systems are a substantial and fast-growing constituent of communication networks. The expression "optical communication system," as used herein, relates to any system which uses optical signals to convey information across an optical waveguiding medium. Such optical systems include, but are not limited to, telecommunications systems, cable television systems, and local area networks (LANs). Optical systems are described in Gowar, Ed. *Optical Communication Systems*, (Prentice Hall, N.Y.) c. 1993, the disclosure of which is incorporated herein by reference. Currently, the majority of optical communication systems are configured to carry an optical channel of a single wavelength over one or more optical waveguides. To convey information from plural sources, time-division multiplexing is frequently employed (TDM). In time-division multiplexing, a particular time slot is assigned to each information source, the complete signal being constructed from the signal portion collected from each time slot. While this is a useful technique for carrying plural information sources on a single channel, its capacity is limited by fiber dispersion and the need to generate high peak power pulses.

While the need for communication services increases, the current capacity of existing waveguiding media is limited. Although capacity may be expanded, e.g., by laying more fiber optic cables, the cost of such expansion is prohibitive. Consequently, there exists a need for a cost-effective way to increase the capacity of existing optical waveguides.

Wavelength division multiplexing (WDM) has been explored as an approach for increasing the capacity of existing fiber optic networks. A WDM system employs plural optical signal channels, each channel being assigned a particular channel wavelength. In a WDM system, optical signal channels are generated, multiplexed to form an optical signal comprised of the individual optical signal channels, transmitted over a single waveguide, and demultiplexed such that each channel wavelength is individually routed to a designated receiver. Through the use of optical amplifiers, such as doped fiber amplifiers, plural optical channels are directly amplified simultaneously, facilitating the use of WDM systems in long-distance optical systems. Exemplary WDM optical communication systems are described in commonly-assigned U.S. Pat. Nos. 5,504,609, 5,532,864, and 5,557,442, the disclosures of which are incorporated herein by reference.

In many applications, such as optical LANs, cable television subscriber systems, and telecommunications networks, there is a need to route one or more channels of a multiplexed optical signal to different destinations. Such routing occurs when optical channels are sent to or withdrawn from an optical transmission line e.g., for sending optical channels between a terminal and an optical bus or routing long distance telecommunications traffic to individual cities. This form of optical routing is generally referred to as "add-drop multiplexing."

One approach to add-drop multiplexing is explored in Giles and Mizrahi, "Low-Loss ADD/DROP Multiplexers for WDM Lightwave Networks," *IOOC Technical Digest*, (The Chinese University Press, Hong Kong) c. 1996, pp. 65–67, the disclosure of which is incorporated herein by reference. In this paper, an add-drop multiplexer is proposed which uses two three-port optical circulators with a narrowband fiber grating positioned between the two optical circulators. Using this configuration, an optical signal to be dropped from an optical transmission path is reflected by the narrowband fiber grating and exits through the drop port of the optical circulator. All other input signals exit via the through port of the optical circulator. Similarly, an optical signal to be added which has a wavelength nominally identical to the optical signal being dropped from the optical transmission path is input to the add port of the second circulator. The signal to be added to the optical transmission path is reflected towards the through port of the second circulator by the same narrowband fiber grating used for signal dropping.

While the disclosed add/drop multiplexers are useful for dropping and adding a single optical channel, problems arise when it is desirable to simultaneously drop or add more than one optical channel. In the system depicted in the cited paper, add-drop multiplexing of more than one optical channel is accomplished through use of sequential add/drop multiplexers, each having a narrowband fiber grating configured to reflect a different wavelength. Although this permits the add-dropping of plural channels, this configuration is costly and adds substantial additional loss to the system.

To reduce the need for plural add-drop multiplexers, plural gratings can be positioned between the two circulators of a single add-drop multiplexer. However, if more than one narrowband fiber grating were positioned between the circulators in the disclosed add-drop multiplexer, one or more optical channels are potentially transmitted through the radiation mode loss region of at least one grating. As is known in the art, strong fiber gratings, i.e., gratings which reflect over 95% of the incident design wavelength, generally include a significant radiation mode loss band on the short wavelength side of the transmission spectrum. See, for example, U.S. Pat. Nos. 5,457,760 and 5,475,780 to Mizrahi, the disclosures of which are incorporated by reference herein. The expression "radiation mode loss" describes any optical signal loss due to scattering outside the core of the waveguide, including radiation scattered in the cladding of the waveguide, and is caused by the grating presence within the core, and not the cladding, of the optical waveguide. Consequently, it is desirable to ensure that optical signals do not pass through the radiation mode loss region of an optical grating. This can be a significant problem in WDM systems with plural optical channels.

In the add-drop multiplexer of the cited paper, if more than one fiber grating were positioned between the circulators, either the optical signals which are dropped or the optical signals which are added could be transmitted through the radiation mode loss region of at least one grating, as described in co-pending, commonly-assigned U.S. patent application Ser. No. 08/622,957 (Attorney Docket No. 112mab), the disclosure of which is incorporated by reference herein. Additionally, add-drop multiplexers which employ optical circulators are extremely costly due to the high cost of optical circulators.

There is a need in the art for cost-effective gratings-based optical add-drop multiplexers which can add and drop plural optical channels. Such add-drop multiplexers could be used in dense WDM optical communication systems for routing of optical traffic among plural locations.

SUMMARY OF THE INVENTION

The present invention provides optical add-drop multiplexers for wavelength division multiplexed optical communication systems in which the channels which are dropped can optionally be different from the channels which are added and different from the channels which are selected in the demultiplexer. The add-drop multiplexer includes first and second optical couplers which optically communicate with each other through an optical filter. The first optical coupler includes at least a first input port and at least first and second output ports and is configured such that optical signals which enter the first input port are output to both the first and second output ports. The second optical coupler includes at least first and second input ports and at least a first output port and is configured such that optical signals which enter the first and second input ports are combined and passed through the output port.

A first optical path optically communicates with the first input port of the first optical coupler for carrying a wavelength division multiplexed optical signal. A second optical path optically communicates with the first output port of the first optical coupler and with the first input port of the second optical coupler. Positioned in the second optical path is an optical filter for selecting portions of the wavelength division multiplexed optical signal received from an output port of the first optical coupler such that the portions of the wavelength division multiplexed signal which are not sent to an input port of the second optical coupler exit the add-drop multiplexer.

A third optical path optically communicates with the second output port of the first optical coupler for receiving a portion of the wavelength division multiplexed optical signal input to the input port of the first optical coupler. The third optical path optically communicates with one or more wavelength selectors, each wavelength selector configured to select one or more optical wavelengths from the wavelength division multiplexed optical signal.

A fourth optical path optically communicates with the second input port of the second optical coupler for carrying one or more optical channels to be added to the WDM optical signal. These optical channels are combined with the "through" portion of the WDM optical signal such that the output is a new wavelength division multiplexed optical signal which is placed onto a fifth optical path optically communicating with the output port of the second optical coupler.

DETAILED DESCRIPTION

Figure 1:
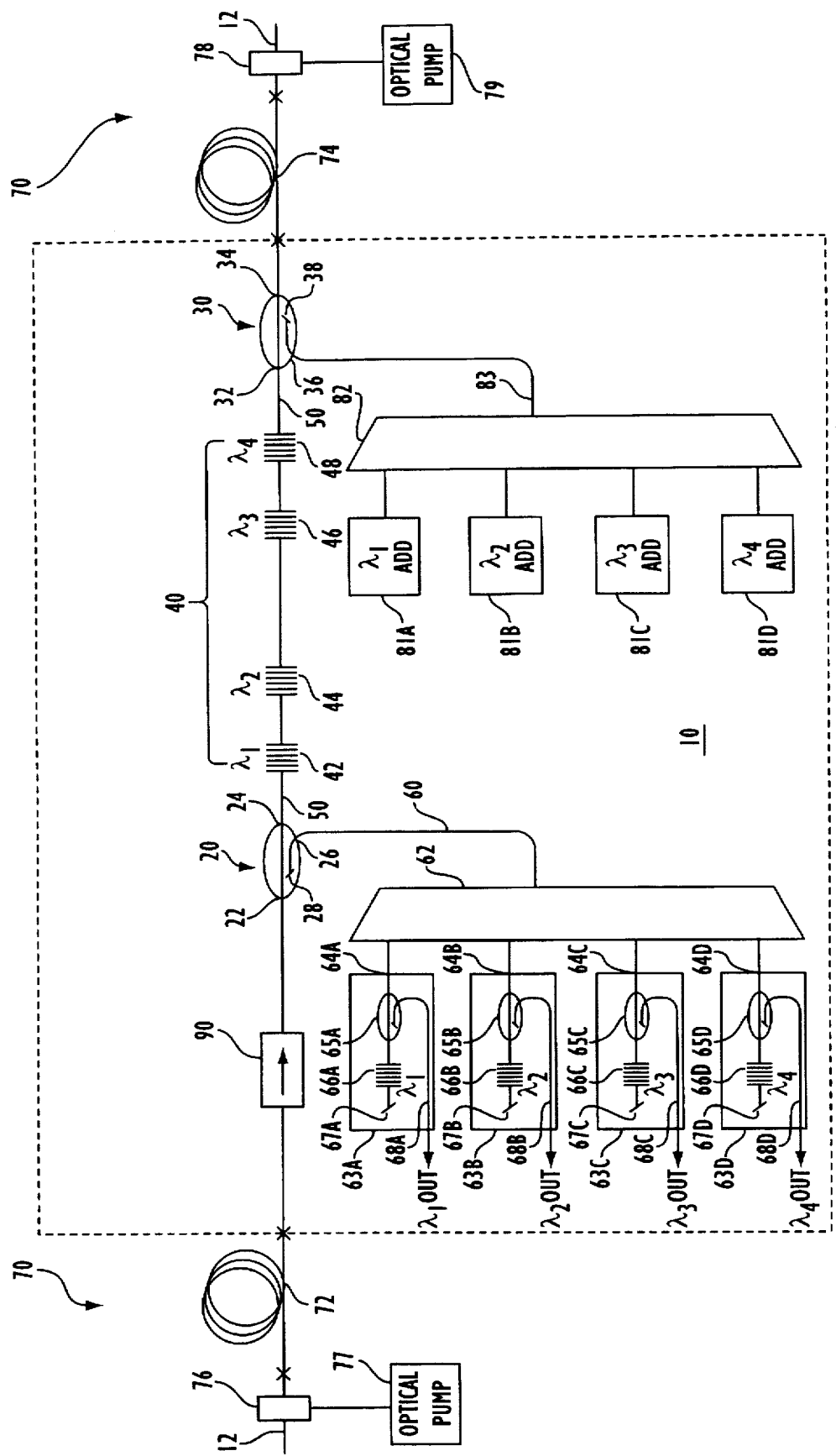
FIG. 1 schematically depicts an add-drop multiplexer according to one embodiment of the present invention.

Turning now to the drawings in detail, in which like numerals indicate the same or similar elements, FIG. 1 schematically depicts an optical add-drop multiplexer 10 according to one embodiment of the present invention. Optical add-drop multiplexer 10 includes first and second optical couplers, respectively depicted as elements 20 and 30 in FIG. 1, with an optical filter 40 optically communicating with each of couplers 20 and 30. Optionally, to improve the noise figure associated with the optical add-drop multiplexer, multiplexer 10 is positioned between the two stages of an optical amplifier 70, discussed in detail below. The dashed lines in the FIGS. indicate the boundary between the add-drop multiplexers and the optical amplifiers, but do not necessarily denote the packaging of the add-drop multiplexer itself.

Optical coupler 20 includes a first input port 22 and first and second output ports 24, and 26, respectively. Optical coupler 20 is configured such that optical signals which enter coupler input port 22 exit through output ports 24 and 26. Optical coupler 30 is substantially similar to optical coupler 30 and includes at least two input ports, 32 and 36, and at least one output port 34. Typically optical couplers 20 and 30 are selected from optical devices which receive optical signals from at least one input port and place the signals onto plural output ports or, alternatively, receive optical signals from plural input ports and place the combined signal onto at least one output port. (Note that the same optical coupler may be used for both couplers 20 and 30, with coupler 20 used to split the incoming WDM signal and coupler 30 used to combine plural input signals.) Exemplary optical couplers are 1×2 fused fiber optical splitters, commercially available from Corning and Gould. In these couplers, the ends of two fused optical fibers are used as the input and output ports with one of the fiber ends terminated (depicted as element 28 for coupler 20 and element 38 for coupler 30 in FIG. 1).

The optical signals placed onto output ports 24 and 26 can be split in various ratios (e.g., 70:30, 80:20, etc.) depending upon the needs of the optical system (e.g., when desiring to equalize signal strength between through optical channels and added optical channels). Similarly, the optical signals from input ports 32 and 36 can be combined in various ratios. In an exemplary embodiment, output port 24 receives 32% of the optical signal input to optical port 22 and output port 26 receives 68% of the optical signal input to optical port 22. Similarly, the optical signal passing through output port 34 comprises 32% of the optical signal input to port 32 and 68% of the optical signal input to port 36 of coupler 30.

To carry optical signals to and from the optical add-drop multiplexer, an optical transmission line 12 optically communicates with the multiplexer 10. The expression "optically communicates" as used herein, refers to any connection, coupling, splice, link, and optical path(s) which may include connections, couplers, splices, links, or the like, by which optical signals carried by one optical system element are imparted to the "communicating" element. Such "optically communicating" devices are not necessarily directly connected to one another, but may be separated by intermediate optical components or devices. As depicted in FIG. 1 the transmission path optically communicates with the multiplexer through optical amplifier 70. In an exemplary embodiment, optical transmission path 12 is a singe mode optical fiber which forms the principal transmission medium for a wavelength division multiplexed optical communication system. For the configuration depicted in FIG. 1, optical transmission path 12 carries a wavelength division multiplexed optical communication signal which includes optical wavelengths $\lambda_1, \lambda_2, \lambda_3$ and $\lambda_4$ to be dropped from the WDM signal.

To block optical wavelengths $\lambda_1, \lambda_2, \lambda_3$ and $\lambda_4$ to be dropped from the WDM signal, optical filter 40 is positioned in an optical path 50 between optical couplers 20 and 30, optically communicating with output port 24 of optical coupler 20 and input port 32 of optical coupler 30. In the exemplary embodiment depicted in FIG. 1, optical filter 40 comprises in-fiber Bragg gratings 42, 44, 46, and 48 respectively configured to reflected optical wavelengths $\lambda_1$, $\lambda_2$, $\lambda_3$ and $\lambda_4$, thereby preventing these optical wavelengths from being transmitted to second optical coupler 30 and further downstream onto optical transmission path 12. Consequently, the remaining optical wavelengths comprising the input wavelength division multiplexed optical signal are carried by optical path 50 to second optical coupler input port 32.

Preferably, Bragg gratings 42, 44, 46, and 48 comprise a series of photoinduced refractive index perturbations in an optical fiber which reflect optical signals within a selected wavelength band. Bragg gratings suitable for use in the optical system of the present invention are described in Morey et al., "Photoinduced Bragg Gratings in Optical Fibers," *Optics and Photonics News*, February 1994, pp. 8-14, and Erdogan et al., *Laser Focus World*, February, 1994, the disclosures of which are incorporated by reference herein. However any high reflectivity Bragg grating can be employed in the set of Bragg gratings 50 in the add-drop multiplexer of FIG. 1. Although optical filter 40 is depicted as using individual Bragg gratings for each of the optical wavelengths to be blocked, broader Bragg gratings, configured to block all the wavelengths or more than one optical channel can also be used in optical filter 40. Alternatively, other optical filters, e.g., multilayer thin film interference filters, can be employed in optical filter 40 to block the optical wavelengths corresponding to the optical channels which are to be blocked from passing through to optical coupler 30.

Although the set of gratings 42, 46, and 48 are depicted as fixed gratings, the add-drop multiplexer can be selected to be reconfigurable through the use of tunable optical filtering elements. For example, the gratings set 40 can be temperature tuned such that the reflection wavelength is shifted in or out of an optical channel band. In an exemplary embodiment, the out-of-band position is a wavelength band situated between adjacent optical channels. When the grating reflection wavelength is tuned to an optical channel band, the corresponding optical channel is blocked. When the grating reflection wavelength is tuned out of an optical channel band, the corresponding optical channel is a "through" channel, i.e., a channel which is transmitted unaffected through add-drop multiplexer 10. In another technique, the gratings are mechanically strained to shift the reflection wavelength in or out of optical channel bands. Alternatively, the gratings can be thermally or mechanically tuned to different optical channels. In this manner, control of either temperature or mechanical strain functions to create a reconfigurable add-drop multiplexer.

Although optical filter 40 blocks (in the case of Bragg gratings, the filter reflects) optical wavelengths which are to be removed from the through channels in the wavelength division multiplexed optical signal carried to optical coupler 30, the blocked optical wavelengths are not used in the demultiplexer portion of add-drop multiplexer 10. Instead, the portion of the wavelength division multiplexed optical signal output to coupler port 26 is demultiplexed to gain the information from the optical wavelengths used in the WDM system. For the configuration shown in FIG. 1, the wavelength division multiplexed signal which is input to port 22 is output to both output ports 24 and 26. Output port 26 optically communicates with optical path 60 from which the optical wavelengths to be demultiplexed are selected. The WDM signal is routed to optical splitter 62 which outputs a portion of the WDM signal to each of wavelength selectors 63A, 63B, 63C, and 63D. Optical splitter 62 is selected from any passive optical component which can divide an optical signal and place a portion of the signal onto each of several output paths. Exemplary optical splitters include 1×N passive splitters available from Corning, Inc., Corning, N.Y., 1×N wideband single mode splitters available from IOT Integrierte Optik GmbH, Waghausel-Kirriach, Germany, and fused fiber combiners available from Gould, Inc., Millersville, Md.

Wavelength selectors 63A-D select the particular wavelength, $\lambda_1$, $\lambda_2$, $\lambda_3$ or $\lambda_4$ from the multiplexed signal and outputting the selected wavelength to a receiver. It is understood that the depicted gratings-based selectors are exemplary; any wavelength selectors/demultiplexer can be employed in the add-drop multiplexers of the present invention including, but not limited to, wavelength routers, multilayer interference filters, Fabry-Perot selectors, and other gratings-based selectors. The WDM optical signal enters the selector through input port 64 and passes through optical coupler 65. Optical couplers 65 are substantially similar to optical couplers 20 and 30, discussed above. The WDM optical signal passes through the optical coupler until it encounters Bragg grating 66. The optical wavelength to be selected is reflected by grating 66 back towards optical coupler 65. The non-selected wavelengths are transmitted through the grating and exit the selector through low reflectivity port 67, typically an angled fiber cut, although any low reflectivity waveguide termination technique may be employed. The selected wavelength, $\lambda_1$, $\lambda_2$, $\lambda_3$, or $\lambda_4$ passes through optical coupler 65 and is output onto optical path 68 for routing to an optical receiver. Various optical receivers suitable for use with add-drop multiplexer 10 are described in Gowar, *Optical Communication Systems*, incorporated by reference above. Alternatively, the selected optical wavelength may be routed to another optical pathway, such as the transmission path of another optical system.

Because the optical wavelengths to be selected are taken from the wavelength division multiplexed optical communication signal, any of the channels in the WDM signal can be selected, i.e., the selected wavelengths need not correspond to the wavelengths blocked by optical filter 40. Advantageously, this feature permits a "broadcast" feature for WDM optical systems which incorporate the add-drop multiplexers of the present invention. For example, the add-drop multiplexer can be configured such that the optical filter does not include a $\lambda_1$ grating while the a wavelength selector corresponding to $\lambda_1$ is provided. Consequently, $\lambda_1$ is transmitted through the add-drop multiplexer and is also selected. When plural add-drop multiplexers are serially configured in an optical system, the optical channel corresponding to $\lambda_1$ is "broadcast" to plural locations simultaneously. This configuration is advantageous for optical cable TV systems, video conferencing, or monitoring a service channel at several locations.

As the "through" channels are passed through optical filter 40 and into port 32 of coupler 30, they are combined with optical channels to be added to the WDM optical communication system. To this end, optical channels $\lambda_1$, $\lambda_2$, $\lambda_3$, and $\lambda_4$ are generated by optical transmitters 81A, 81B, 81C, 81D and combined in optical combiner 82 (substantially similar to optical splitter 62, operated in the reverse manner) for transmission along optical path 83 to coupler input port 36. Suitable laser transmitters typically comprise an optical source, such as a DFB laser and a modulator for imparting information to the optical signal emitted by the optical source and are described in the Gowar book, incorporated by reference above. The optical channels $\lambda_1$, $\lambda_2$, $\lambda_3$, and $\lambda_4$ are added to the through channels of the WDM optical signal passed by optical filter 40. The combined signal is output from the second optical coupler 30 through output port 34 and eventually placed onto optical transmission path 12 to be carried further downstream through the WDM optical system. Although the added optical channels are depicted as corresponding to the wavelengths blocked by optical filter 40, this is not a requirement for the add-drop multiplexer operation. Because coupler 30 combines the optical signals from input ports 32 and 34, the optical signals which are added via transmission path 83 do not contact the optical filtering elements but are directly combined with the signals from first input port 32. Consequently, an arbitrary number of optical channels may be added to the optical system; the wavelengths of the optical channels do not need to correspond to the wavelengths of the channels blocked by optical filter 40.

As discussed previously, the optical add-drop multiplexer of the present invention is advantageously situated between the two stages of an optical amplifier to provide a good noise figure and a good signal strength to both the optical signals to be demultiplexed and to the optical signals to be added the WDM system. As depicted in FIG. 1, optical amplifier 70 comprises first and second stages 72 and 74 selected from optical waveguides doped with a material which can produce laser action in the waveguide. Such materials include rare earth dopants such as erbium, neodymium, praseodymium, ytterbium, or mixtures thereof. Pumping of the doped waveguide at a specific pump wavelength causes population inversion among the electron energy levels of the dopant, producing optical amplification of the wavelength division multiplexed optical signals. For doped fiber amplifiers employing erbium as the dopant, a wavelength band between approximately 1500 nm and approximately 1590 nm provides gain to optical signals when the doped fiber is pumped.

To supply the amplifier stages with pump energy, connecting elements 76 and 78 are provided. These are typically wavelength selective multiplexers which permit pump radiation to enter the doped fiber sections without allowing transmission channel radiation to pass into the pump. The connecting elements optically communicate with optical pumps 77 and 79. The optical pumps are generally selected from 980 and 1480 nm laser sources. In one embodiment, a 980 nm laser is used as optical pump 77 to pump the first stage of the amplifier while a 1480 nm laser is used as optical pump 79 to pump the second stage of the amplifier. To increase the gain in the second stage of the amplifier, light from the 980 pump can be used to pump both the first and second stages of the amplifier while the 1480 pump is simultaneously used to pump the second stage of the amplifier.

Optionally, optical isolator 90 is positioned between the two stages of optical amplifier 70. Isolator 90 prevents the channels reflected from optical filter 40 from re-entering the first stage of the optical amplifiers. Optionally, a second optical isolator is positioned between second optical coupler 30 and optical filter 40 to prevent the added optical channels from traveling upstream towards the optical filter. Optical isolators positioned between the stages of multiple-stage optical amplifiers improve the performance of the amplifier by preventing amplified spontaneous emission (ASE) from the second stage of the amplifier from reaching the first stage of the optical amplifier. Additional optical isolators may optionally positioned before coupler 76 and after coupler 77 (not shown). Further, other optical components besides the add-drop multiplexer can be optionally positioned between the first and second stages of the amplifier. For example, optical interference filters for add/dropping an optical service channel, as described in U.S. Pat. No. 5,532,864, can be positioned between the amplifier stages.

It is understood that the depicted optical amplifier is exemplary; other optical amplifier configurations can be used in conjunction with the present invention. Suitable optical amplifiers, their materials , and their operation are further described in copending U.S. patent application Ser. No. 08/554,976 (Attorney Docket No. 106mab), Gowar, Ed. *Optical Communication Systems*, Bjarklev, *Optical Fiber Amplifiers: Design and System Applications*, (Artech House, Norwood, Mass.), c. 1993, and Desurvire, *Erbium-Doped Fiber Amplifiers*, (John Wiley & Sons, Inc., NY), c. 1994, the disclosures of which are incorporated herein by reference.

Figure 2:
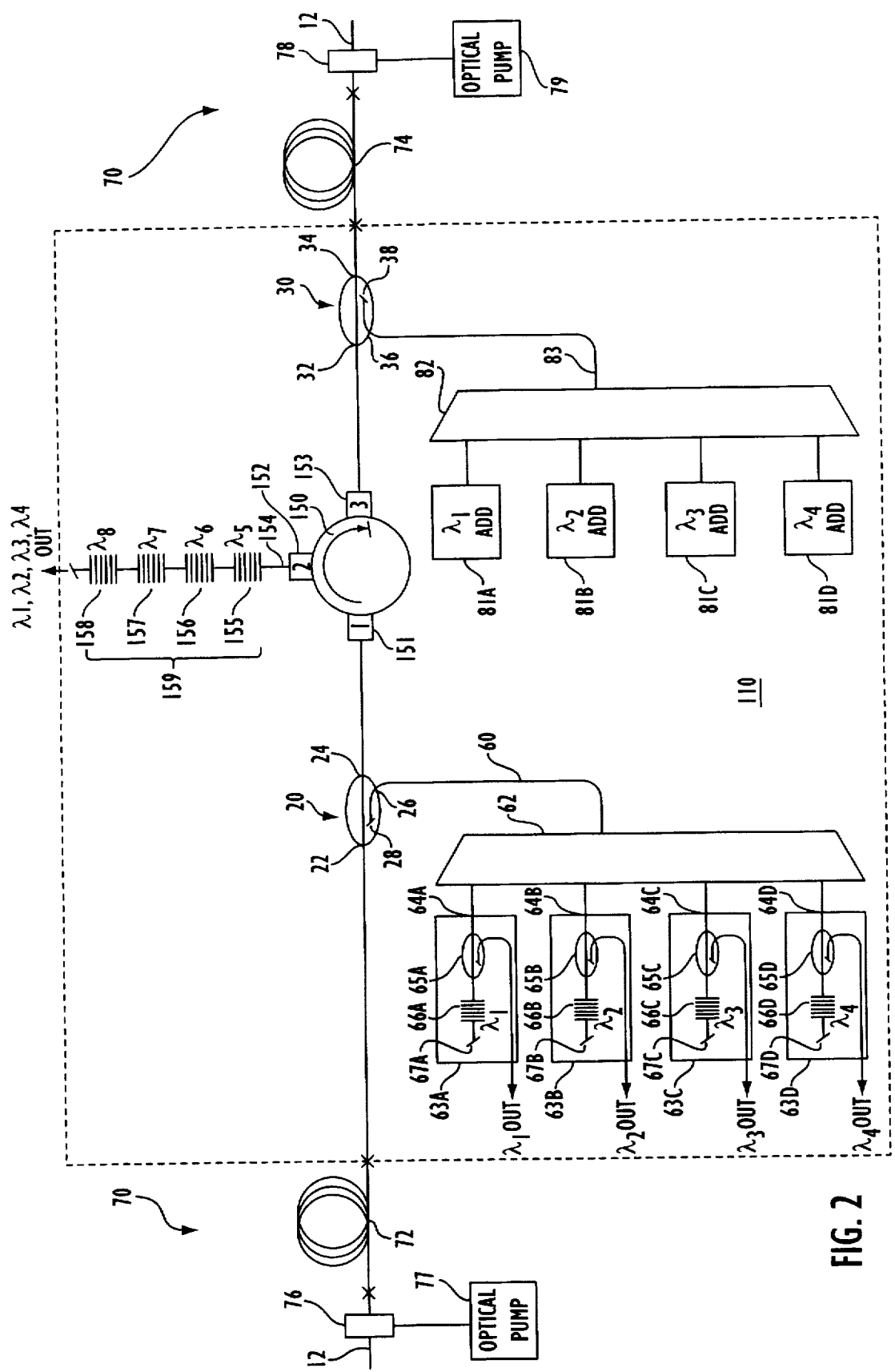
FIG. 2 schematically depicts an add-drop multiplexer according to a further embodiment of the present invention.

FIG. 2 depicts an add-drop multiplexer 110 according to a further embodiment of the present invention. As with the add-drop multiplexer of FIG. 1, add-drop multiplexer 110 comprises optical couplers 20 and 30 wavelength selectors 65 and optical sources 81, all configured and operating in substantially the same manner as their counterparts in the FIG. 1 system. The add-drop multiplexer of FIG. 2 differs from the add-drop multiplexer of FIG. 1 in the manner in which the through optical channels of the incident WDM optical signal are transmitted between the first and second optical couplers. In add-drop multiplexer 110, an optical circulator 150 is positioned on an optical path interconnecting first optical coupler output port 24 and second optical coupler input port 32. Although the use of an optical circulators is exemplary, an optical coupler can be used in place of the optical circulator when higher optical losses are acceptable.

Optical circulator 150 is configured such that optical signals which enter circulator port 151 exit through circulator port 152 and optical signals which enter circulator port 152 exit through circulator port 153. An optical path 154 optically communicates with second circulator port 152. Optical path 154 has positioned therein optical filter 159 configured to reflect the through optical channels back towards circulator port 152 to be output through circulator port 153 for continuation through to the second optical coupler. In an exemplary embodiment, optical filter 159 comprises Bragg gratings 155, 156, 157, and 158, respectively configured to reflect $\lambda_5$, $\lambda_6$, $\lambda_7$, and $\lambda_8$. To prevent radiation mode loss, the reflected optical channel wavelengths are ordered from longest to shortest (see, for example, U.S. patent application Ser. No. 08/622,957 (Attorney Docket No. 112 mab) the disclosure of which is incorporated by reference herein. Advantageously, the optical filter configuration of FIG. 2 permits transmission of the desired optical channels only. The undesired channels as well as any ASE generated in the first stage of the optical amplifier exit the add-drop multiplexer through a low-reflectivity termination technique or may be used for other purposed (such as routing to a demultiplexing/receiving system or to another optical system). The through optical channels enter second optical coupler 30 through input port 32 where they are combined with the optical channels to be added from input port 36, as in the previous embodiment.

Figure 3:
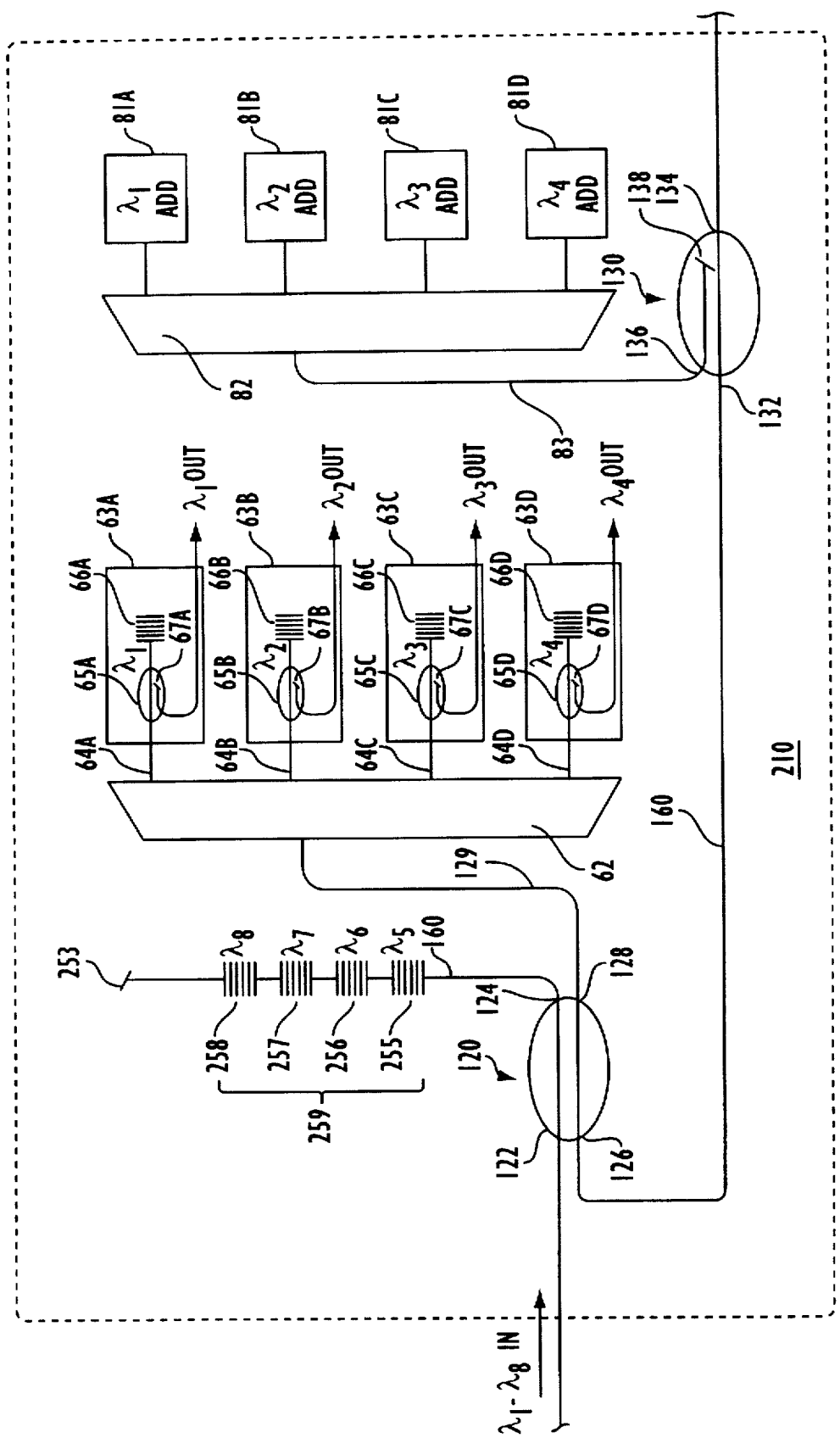
FIG. 3 schematically depicts an add-drop multiplexer according to a further embodiment of the present invention.

FIG. 3 depicts another embodiment of an add-drop multiplexer according to the present invention. As with add-drop multiplexers 10 and 110, wavelength selectors 63 and optical transmitters 81 are substantially similar to those depicted in FIGS. 1 and 2. Add-drop multiplexer 210 includes first and second optical couplers 120 and 130. Coupler 130 is substantially similar to optical coupler 30 in FIGS. 1 and 2 with the exception that the terminated optical fiber 138 is in the locations depicted in FIG. 3. Optical coupler 120 uses all four ports 122, 124, 126, and 128. Input port 122 receives the optical channels from the transmission path and outputs the channels onto optical paths 60 and 129.

In add-drop multiplexer 210, optical path 60 includes optical filter 259 for selecting the through channels from the incident wavelength division multiplexed optical signal. As in the embodiment of FIG. 2, optical filter 259 comprises Bragg gratings 255, 256, 257, and 258, respectively configured to reflect $\lambda_5$, $\lambda_6$, $\lambda_7$, and $\lambda_8$. The non-selected optical channels pass through the optical filter and can exit the optical system through termination 253 or, alternatively, can be used for other purposes (e.g., can be routed to another system, used for optical monitoring, or demultiplexed and routed to optical receivers).

Optical path 129 receives the portion of the wavelength division multiplexed optical signal output through first coupler output port 126. Optical path 129 communicates with optical splitter 62. Optical splitter 62 outputs a portion of the WDM optical signal to each of wavelength selectors 63A, 63B, 63C, and 63D for selecting the optical channels to be demultiplexed from the WDM optical signal.

The optical channels selected by optical filter 259 re-enter optical coupler 120 through port 124 and are output onto optical path 160 through coupler output port 126. These optical channels are input to optical coupler 130 through coupler port 132 where they are combined with the optical channels input to port 136 by optical transmitters 81 and output through coupler output port 134.

The optical add-drop multiplexers of the present invention are advantageously employed in wavelength division multiplexed optical communications such as those described in U.S. Pat. Nos. 5,504,609, 5,532,864, 5,557,439 and U.S. patent application Ser. No. 08/669,049 (Attorney Docket No. 116 mab) the disclosures of which are incorporated by reference herein. When using a channel plan such as the channel plan disclosed in Ser. No. 08/669,049 the optical wavelengths $\lambda_1$, $\lambda_2$, $\lambda_3$, and $\lambda_4$ can correspond to channels 16, 15, 14, 13, the channels with the four shortest wavelengths in a 16-channel optical communication system, ordered from shortest to longest wavelengths in the direction proceeding away from the coupler port.

While the foregoing invention has been described in terms of the embodiments discussed above, numerous variations are possible. For example, the design of the present add-drop multiplexer easily lends itself to a modular implementation in which the optical coupler set, paired wavelength selectors, the optical filter, and the optical splitter-combine reach form a separately packaged module. Consequently, the add-drop multiplexers are easy to manufacture and to reconfigure. Further, using tunable Bragg gratings in the optical filter and/or optical selectors coupled to one or more controllers permits dynamic reconfiguration of the add-drop multiplexers of the present invention. Accordingly, modifications and changes such as those suggested above, but not limited thereto, are considered to be within the scope of following claims.

What is claimed is:

1. An optical add-drop multiplexer for a wavelength division multiplexed optical communication system comprising:

a first optical coupler having at least a first input port and at least first and second output ports, the first optical coupler configured such that optical signals which enter the first input port are output to both the first and second output ports;

a second optical coupler having at least first and second input ports and at least a first output port, the second optical coupler configured such that optical signals which enter the first and second input ports are combined and output to the at least first coupler output port;

a first optical path optically communicating with the first input port of the first optical coupler, the first optical path configured to carry a wavelength division multiplexed optical communication signal including one or more optical wavelengths to be selected from the wavelength division multiplexed optical communication signal;

a second optical path optically communicating with the first output port of the first optical coupler having positioned therein an optical filter for selecting portions of a wavelength division multiplexed optical communication signal received from the first output port of the first optical coupler to be sent to the first input port of the second optical coupler, the optical filter configured such that the portions of the wavelength division multiplexed signal which are not sent to the first input port of the second optical coupler exit the add-drop multiplexer;

a third optical path optically communicating with the second output port of the first optical coupler for receiving a portion of the wavelength division multiplexed optical signal input to the input port of the first optical coupler, the third optical path optically communicating with one or more wavelength selectors, each wavelength selector configured to select one or more optical wavelengths to be dropped from the portion of the wavelength division multiplexed optical communication signal output to the second coupler output port;

a fourth optical path optically communicating with the second input port of the second optical coupler, the fourth optical path optically communicating with one or more optical sources for adding optical wavelengths to the wavelength division multiplexed optical signal transmitted through the second optical path; and a fifth optical path optically communicating with the at least one output port of the second optical coupler, the fifth optical path configured to transmit the added optical wavelengths from the fourth optical path and the portion of the wavelength division multiplexed optical signal transmitted through the set of one or more Bragg gratings in the second optical path.

2. An optical add-drop multiplexer for a wavelength division multiplexed optical communication system as recited in claim 1 in which optical filter comprises a set of one or more Bragg gratings.

3. An optical add-drop multiplexer for a wavelength division multiplexed optical communication system as recited in claim 2 wherein the set of one or more Bragg gratings comprises tunable Bragg gratings.

4. An optical add-drop multiplexer for a wavelength division multiplexed optical communication system as recited in claim 2 wherein the Bragg gratings of the optical filter are configured to reflect non-selected channels of an incident wavelength division multiplexed optical communication signal.

5. An optical add-drop multiplexer for a wavelength division multiplexed optical communication system as recited in claim 4 wherein the optical wavelengths selected by the wavelength selectors include wavelengths reflected by the Bragg gratings.

6. An optical add-drop multiplexer for a wavelength division multiplexer optical communication system as recited in claim 1 wherein the Bragg gratings of the optical filter are configured to reflect channels of an incident wavelength division multiplexed optical communication signal selected to pass through to the second optical coupler.

7. An optical add-drop multiplexer for a wavelength division multiplexed optical communication system as recited in claim 6 wherein the optical wavelengths selected by the wavelength selectors include wavelengths reflected by the Bragg gratings.

8. An optical add-drop multiplexer according to claim 1 wherein the optical filter selects the portions of the wavelength division multiplexed optical signal to be sent to the first input port of the second optical coupler by reflecting optical channels which comprise the selected portions of the wavelength division multiplexed optical signal.

9. An optical add-drop multiplexer according to claim 1 wherein the optical filter selects the portions of the wavelength division multiplexed optical signal to be sent to the first input port of the second optical coupler by reflecting optical channels which comprise the non-selected portions of the wavelength division multiplexed optical signal.

10. An optical add-drop multiplexer for a wavelength division multiplexed optical communication system as recited in claim 1 in set of Bragg gratings comprises one or more in-fiber Bragg gratings.

11. An optical add-drop multiplexer for a wavelength division multiplexed optical communication system as recited in claim 1 wherein a three-port optical circulator is positioned in the second optical path such that the first circulator port is connected to the second optical path, the optical filter is connected to the second circulator port, and the first input port of the second optical coupler is connected to the third circulator port such that optical signals reflected by the optical filter exit the third circulator port into the second optical coupler.

12. An optical add-drop multiplexer for a wavelength division multiplexed optical communication system as recited in claim 1 further comprising a third coupler output port in the first optical coupler for receiving optical signals reflected through the coupler by the optical filter, the third optical coupler port being connected to the first input port of the second optical coupler.

13. An optical add-drop multiplexer for a wavelength division multiplexed optical communication system comprising:

a first optical coupler having at least a first input port and at least first and second output ports, the first optical coupler configured such that optical signals which enter the first input port are output to both the first and second output port;

a second optical coupler having at least first and second input ports and at least a first output port, the second optical coupler configured such that optical signals which enter the first and second input ports are combined and output to at least the first coupler output port;

a first optical path optically communicating with the first input port of the first optical coupler, the first optical path configured to carry a wavelength division multiplexed optical communication signal including one or more optical wavelengths to be selected from the wavelength division multiplexed optical communication signal;

a second optical path optically communicating with the first output port of the first optical coupler and optically communicating with the first input port of the second optical coupler, the second optical path having positioned therein a set of one or more Bragg gratings configured to reflect one or more optical wavelengths included in the wavelength division multiplexed optical communication signal carried by the first optical path, the set of one or more Bragg gratings and the first optical coupler being configured such that the reflected wavelengths are reflected towards the first output port of the first optical coupler where the reflected wavelengths exit the optical add-drop multiplexer, the reflected wavelengths corresponding to optical channels to be dropped from a wavelength division multiplexed optical communication signal, the remaining optical wavelengths in the wavelength division multiplexed optical communication signal being transmitted by the second optical path to the first input port of the second optical coupler;

a third optical path optically communicating with the second output port of the first optical coupler for receiving a portion of the wavelength division multiplexed optical signal input to the input port of the first optical coupler, the third optical path optically communicating with one or more wavelength selectors, each wavelength selector configured to select one or more optical wavelengths to be selected from the portion of the wavelength division multiplexed optical communication signal output to the second coupler output port;

a fourth optical path optically communicating with the second input port of the second optical coupler, the fourth optical path optically communicating with one or more optical sources for adding optical wavelengths to the wavelength division multiplexed optical signal transmitted through the second optical path; and a fifth optical path optically communicating with the at least one output port of the second optical coupler, the fifth optical path configured to transmit the added optical wavelengths from the fourth optical path and the portion of the wavelength division multiplexed optical signal transmitted through the set of one or more Bragg gratings in the second optical path.

* * * * *